United States Patent [19]
Zoffel et al.

[11] Patent Number: 5,274,547
[45] Date of Patent: Dec. 28, 1993

[54] SYSTEM FOR GENERATING AND TRANSMITTING CREDIT REPORTS

[75] Inventors: George S. Zoffel, Kirkland, Wash.; Nichola A. St. Laurent; Robb Murdock, both of Encinitas, Calif.

[73] Assignee: Credco of Washington, Inc., Seattle, Wash.

[21] Appl. No.: 637,071

[22] Filed: Jan. 3, 1991

[51] Int. Cl.⁵ .............................................. G06G 7/52
[52] U.S. Cl. ..................................... 364/408; 364/401
[58] Field of Search ........................ 364/401, 406, 408

[56] References Cited

U.S. PATENT DOCUMENTS 3,719,927  3/1973  Michels et al. .................... 364/406
5,132,899  7/1992  Fox ...................................... 364/401

OTHER PUBLICATIONS

Woods, "In-House Credit Reporting-Consider the Options", *Credit World*, vol. 79, No. 3, Jan./Feb. 1991, pp. 34-37.
Defendorf, "Loan officers now producing credit reports", *San Francisco Business Times*, vol. 1, Apr. 20, 1987, p. 23.
Credicheck IV software program product description, Magnum Communications Ltd., Atlanta GA, 1977.
McArthur, "In-House Options for Credit Retrieval", *Bottomline*, vol. 5, No. 7, Jul. 1988, pp. 20-24.
"Title search service puts attorneys on-line", *Computerworld*, Apr. 24, 1989, p. 68.
"Credit reports generated at low cost", *Computers in Banking*, vol. 6, No. 2, Feb. 1989, p. 23.
Charlet, "Every Lender's Wish: Quick, Easy, Correct Credit Reports", *Mortgage Banking*, vol. 48, No. 6, Mar. 1988, pp., 85-92.
Monk et al., "Accessing credit bureau files with a PC", *Computers in Banking*, vol. 6, No. 4, Apr. 1988, pp. 66, 68.

*Primary Examiner*—Roy N. Envall, Jr.
*Assistant Examiner*—Jennifer L. Hazard
*Attorney, Agent, or Firm*—Hughes & Multer

[57] ABSTRACT

Systems and methods for generating credit reports. The system includes a central data processing facility (also referred to as a data processor or host computer) which is connectable to the three national credit repositories dedicated data links. The central data processor requests credit information on an applicant from one or more of the repositories, generates a credit report, and transmits the report to the requesting user (i.e., customer). Requests and reports are transmitted via a communications system or network which includes: local telephone lines; Redi-Access; Accunet; and a dedicated, high speed, data transmission channel. If data is inputted from more than one repository, the central data processing facility eliminates duplicated data, selects the best data if there are conflicts, and merges the remaining data into a single report.

14 Claims, 5 Drawing Sheets

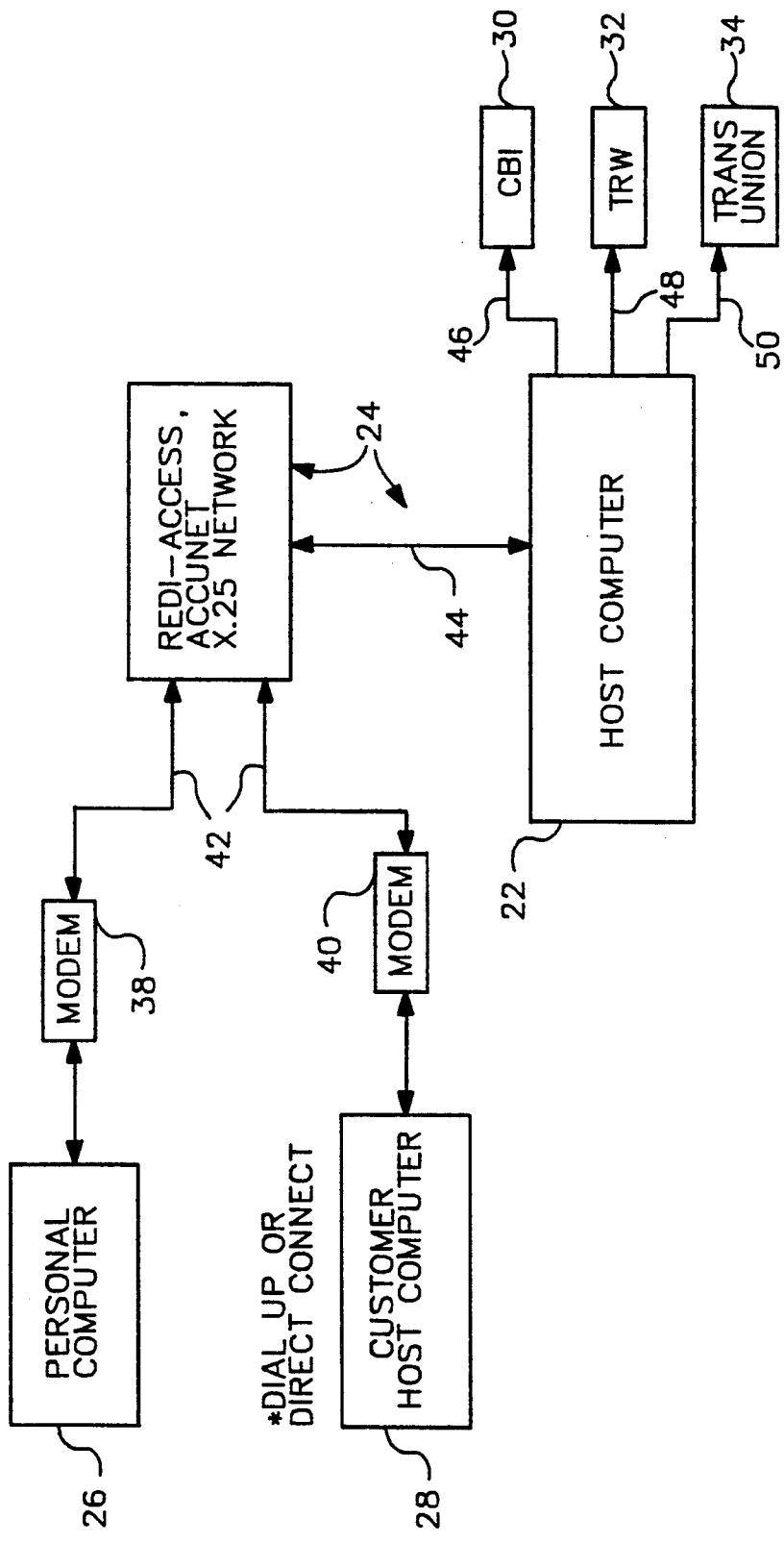

FIG. 2

CREDCO®

ENTRY SCREEN  ENTRY #: 1

LAST NAME: MURDOCK          FIRST NAME: ROBB
MID.NAME: MITCHELL    GEN.:     SSN: 449864062  AGE: 38
LAST NAME: MURDOCK          FIRST NAME: SARAH
MID.NAME: JANE        GEN.:     SSN: 239968504  AGE: 35
CURRENT ADDRESS: TYPE: N  NORMAL P.O.BOX  RURAL ROUTE
HOUSE: 1420    STREET: PEGASO           DIR:    APT#:
CITY: ENCINITAS           STATE: CA  ZIP: 92024  CNTRY:
PREVIOUS ADDRESS: TYPE: N  NORMAL P.O.BOX  RURAL ROUTE
HOUSE: 906    STREET: STONECREST        DIR:    APT#:
CITY: HOUSTON             STATE: TX  ZIP: 77018  CNTRY:
NOTES: LOAN NUMBER 3
TYPE ACCESS: J  NUMBER OF BUREAUS:       CBI 1 TRW 2 TUC

F1-HELP  F2-ORDER  F3-VIEW  F4-PRINT  F5-DELETE  F6-RUN
F7-BATCH RUN  F10-EXIT  PGUP  PGDN  C-PGUP  C-PGDN

| PROCESS STATUS | | | |
|---|---|---|---|
| OVPD | LNAME | FNAME | SSN |
| CCC | MURDO | ROB | 449864062 |
| CC  | ST.LA | NIC | 100000001 |
| CC  | BURNE | CHA | 100000022 |
| CCC | RANDO | TOD | 100020334 |
| CC  | NAME  | NAM | 100000041 |
| CC  | NAME  | NAM | 100000042 |
| CC  | NAME  | NAM | 100000043 |
| CC  | NAME  | NAM | 100000044 |
| CC  | APPLI | JOE | 987654321 |
| EC  | FKDFK | FDF | 1223342435 |
| CCC | PUCKE | WIL | 517582672 |

1 — CONNECT
2 — RECEIVE INQUIRY BY SERVER
3 — TRANSMIT CREDIT DATA FROM SERVER

SYSTEM FOR GENERATING AND TRANSMITTING CREDIT REPORTS

TECHNICAL FIELD OF THE INVENTION

In one aspect, the present invention relates to a novel system for making credit reports available in a very short period of time to any subscriber who has an appropriate computer terminal, irrespective of the geographical location of the terminal.

"Geographically removed" and similar terms are employed herein to identify both locations which may be in different cities, states, etc. from a central computer facility of the system and locations which may be closer together but still spatially separated; e.g., user terminals on different desks in the same room as the central data processing facility or in different parts of the same building.

In a second, and equally important aspect, the present invention relates to a novel, subscriber-accessible system and to a method for: acquiring data from multiple repositories of credit information; selecting the most accurate, and eliminating duplicate, items of information; merging the remaining items of information into a report formatted for easy reading; and electronically transmitting the report to a subscriber-designated -computer terminal. The subscriber may be what is implied by this term or an organization which is an intermediary, ordering reports and making them available to third parties dealing with credit applicants.

BACKGROUND OF THE INVENTION

Consumer credit reporting has been utilized in America for well over a century. Originally, when everyone in a community knew everyone else, there was little trouble establishing the credit worthiness of individuals. As cities grew and their populations became larger, merchants began calling each of the references given by credit applicants. The number of these calls quickly increased, and entire departments had to be set up to make the inquiries. Soon, a more efficient way to obtain and store credit information became a necessity.

The solution was the establishment of credit repositories or bureaus. Credit repositories give credit granters quick and easy access to credit information from one source, thereby reducing costs to all parties. Credit bureaus serve both the consumer and the credit granting industry. Without a central repository of information maintained by an unbiased organization, neither group would enjoy the benefits of credit.

Credit bureaus realize their income from subscribing creditors, who pay fees to the bureau. In return, the bureau maintains credit files and makes credit information available to its subscribers.

Initially, each small town probably had an independent credit bureau serving the local credit community. As the credit industry grew and consumers became more transient, there developed a need for regional or national sources of information.

Today, there are three, major, national credit reporting systems or repositories:
Thompson, Ramo & Wooldridge (TRW)
Transunion Credit Information Company, Inc. (TU)
Credit Bureau, Inc. (CBI)

Each of these companies owns credit bureaus and makes computerized credit files available to other, independently owned, subscriber credit bureaus as well. Many of the small town credit bureaus still in existence have an affiliation with one of these national repositories.

Information enters the credit reporting system computers through:
Accounts receivable tapes which are regularly sent by credit granters to credit bureaus and used by them to update their files
Manual updates through computer terminals Inquiries made through remote terminals (the repositories use the information given to them in the inquiry to update their files)

Subscribers to a repository can access information contained in a credit file in a number of ways:
Remote teleprompter (these are small terminals that are provided by the repository; the operator types each inquiry while on-line)
CPU to CPU (computer to computer)
Personal computer (with software designed for credit access)
Verbal inquiry (to small credit bureaus that may or may not have their information computerized)

For small credit subscribers, the most common of these accessing methods are remote teleprompters and personal computers. In both cases, the subscriber must dial up and access each repository separately and obtain separate reports from each. A typical inquiry requires that information about the applicant be typed directly into the teleprompter or onto a screen if the subscriber is working with a personal computer program. This information includes the applicant's name, address, social security number, and employer and any previous addresses. In both cases, if an applicant has had a previous residence in another region, the inquiry must be typed and sent separately to a repository for each region. This creates extra labor and a higher margin for error.

Each repository has stronger coverage in some areas than in others. For a variety of reasons, many subscribers report to only one national repository or report only to a local credit bureau. As national repositories purchase local credit bureaus to increase their coverage, one repository may obtain the most complete credit files in an area simply by purchasing the largest local bureau.

Many companies who access credit files subscribe to only one national repository as well. This may preclude them from obtaining the most complete credit report if their applicant lives in a region that may be better covered by another repository. Even though a company may subscribe to more than one national repository, the operator must make a decision (based on the applicant's zip code) as to which national repository has the most complete coverage. This is labor intensive and can have a high error factor as the repositories are constantly updating their files. Even though the repositories send out their own table of who has the best coverage by zip code, it requires labor and inquiry costs on the subscriber's part to run those comparison checks needed to verify the validity of the claims of better coverage made by each national repository.

If the subscriber chooses to access two or more repositories, each must be accessed independently; and separate reports are obtained. These separate reports can be difficult to read together because they are formatted differently and typically contain a number of duplicate tradelines (even within the same report). The operator must manually compare the reports, resolve the duplicates, and obtain the most current information on each tradeline. This obviously increases the labor costs involved in obtaining credit information. Furthermore, the chances for error are significant.

SUMMARY OF THE INVENTION

There have now been invented, and disclosed herein, a novel system and method for generating credit reports which eliminate the foregoing and other drawbacks of the above-discussed, currently employed method of generating credit reports.

This novel system is designed to perform six functions: data input, report gathering, data comparison, data merging, report formatting, and report delivery.

First, the system gathers subscriber provided data relevant to a credit applicant and forwards that data to a central data processing facility, which may be in a different city and/or state than the subscriber's computer terminal. Using this data, the central facility requests credit reports from appropriate repositories such as the three national credit repositories: TRW, CBI and Trans Union. These repositories are be widely separated from each other and from the central, data processing facility.

When the credit reports are received from the repositories, they are compared. If differences occur between like items in the reports, the most accurate data is selected. Duplicate items in the several reports are eliminated. The surviving, thus selected raw data items are merged into a single report which is formatted for easy reading.

The final report is returned electronically to a computer terminal designated by the subscriber who originated the request for the credit report. Even with the current limitations of long distance communication links, the transaction can be completed and the report made available at the subscriber designated terminal in as little as one-two minutes.

OBJECTS OF THE INVENTION

From the foregoing, it will be apparent to the reader that one important and primary object of the present invention resides in the provision of novel, improved systems and methods for generating credit reports and making those reports available in very short periods of time to subscribers who may be geographically removed from the report generating facility.

Other also important but more specific objects of the present invention reside in the provision of credit report generating and transmitting systems and methods as characterized in the preceding object:

which are capable of making credit reports available to subscribers in shorter periods of time than is possible by using conventional credit reporting techniques, even when the subscriber is geographically removed from the credit report-generating facility of the system;

which have the capability of acquiring credit information from multiple repositories of credit information, eliminating duplicate items, selecting the most accurate of different versions of the same items, and presenting the surviving, selected items in an electronically transmitted form and in a format which is easily read when the report is displayed on a monitor screen or printed out by the requesting subscriber;

which, from the subscriber's viewpoint, are flexible, forgiving, and user friendly;

which provide for batch-transmission of requests for credit reports from a subscriber's terminal to a central data processing facility and which allow batch-transmission to be interrupted for transmission of a priority request and then resumed;

which allow credit data for a given report to be acquired from a specified one, or multiple, selected ones, or all of the available repositories of credit data at the option of the subscriber who requests the report;

which are capable of automatically filing credit reports in an orderly fashion for each subscriber; and which are capable of generating both individual and joint credit reports.

Other important objects and features and additional advantages of the invention will be apparent to the reader from the foregoing and the appended claims and as the ensuing detailed description and discussion proceeds in conjunction with the accompanying drawing.

BRIEF DESCRIPTION OF THE DRAWING

In the drawing:

FIG. is a block diagram of a system for generating credit reports and transmitting those reports to subscribers in response to subscribers-made requests, all in accord with the principles of the present invention;

FIG. 2 is a screen seen by a user (or customer) when the user initiates a request for a credit report at his or her computer or computer terminal;

DETAILED DESCRIPTION OF THE INVENTION

Overview

Figure 3:
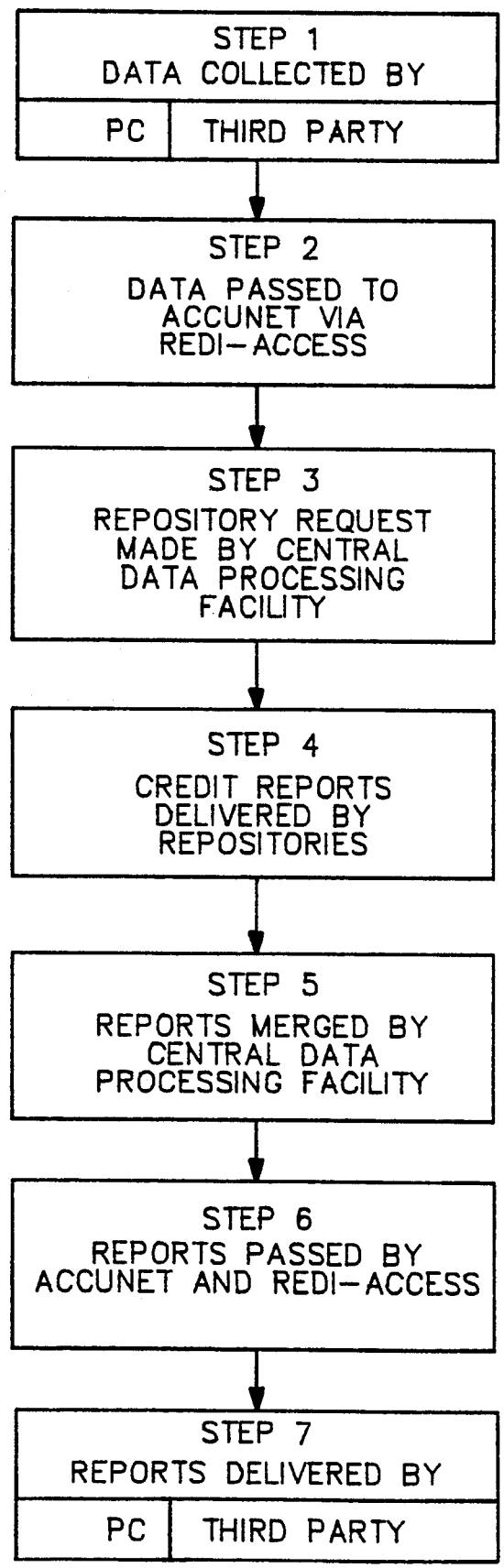
FIG. 3 is a flow diagram of a process for generating credit reports in accord with the principles of the present invention.

Referring now the drawing, FIG. 1 depicts a system 20 which embodies the principles of the present invention. System 20 responds to a subscriber's request by generating a credit report on a designated applicant or set of applicants—husband and wife, for example—and electronically transmitting the report to a computer terminal also designated by the requesting subscriber.

The major components of system 20 include a central data processing facility 22 and a communication system 24 for connecting the central data processing facility to subscribers' personal or other computers such as those identified by reference characters 26 and 28. The central data processing facility or host computer 22 is also linked to repositories of credit information. These, identified by reference characters 30, 32, and 34 in FIG. 1, will typically be the national credit repositories: TRW, CBI, and Trans Union.

Any number of subscribers can access central data processing facility 22 and request credit reports. The data communications links between the additional subscriber terminals and central facility 22 have not been shown as they may duplicate the one that is illustrated and because these several links employ common components as will become apparent hereinafter.

Referring now to FIG. 2, it was pointed out above that the process of obtaining a merged credit report in accord with the principles of the present invention is typically initiated by way of a personal computer although a mini- or mainframe computer can equally well be employed. In one application of the invention, the user is presented with an easily filled in screen 36 (see FIG. 2) soliciting the input needed to collect the applicant data. The user may fill in as many screens as the requirements of the moment dictate up to a maximum of nine hundred ninety nine. Any subset of the applications or all the applications together may be batch transmitted to the central data processing facility 22, or any one application may be sent alone. An entire group may be slated for batch transmission; and, in the middle of the process, a high priority application may be sent out of order, if that is deemed desirable.

Once the applicant data has been collected, it is passed over local telephone lines 42 to communications network or system 24 which includes Redi-Access and Accunet. Redi-Access is a service of Control Data Corporation; it provides a permanent connection to Accunet. Accunet is a nationwide, high speed, data transmission network using a combination of satellite, microwave, fiberoptic and wire facilities. Accunet routes the data from the Redi-Access connection to a high speed data channel 44 in communications network 24 at a minimum speed of 187,000 characters per second. Channel 44 moves the data to central facility 22.

When the applicant data user's query is received by host computer 22, it is appropriately formatted to query each of the three national data repositories. The repositories are simultaneously asked for credit reports on the applicant via leased data channels 46, 48, and 50. The number of data repositories actually queried is dependent on choices made when the customer's account is initialized, the applicant's zip code, and any special requests made by the customer and transmitted with the applicant data.

The repositories return the applicant's credit data to host computer 22 via links 46, 48, and 50. If two or more repositories are queried, the host computer compares the several sets of data, searching for duplicate entries. It then merges the data into a single report. The report consists of the most correct data items encountered in the duplicates plus data received but not duplicated. Once the report data has been collected, compared and merged, it is formatted for printing and placed on the high speed data channel 44. The data channel returns the report to Accunet, Accunet carries the report to the RediAccess link, and the report is relayed to the end user's computer via telephone lines 42.

If the end user is using a personal computer such as 26, the report is written to a file on one of the computer's disks. The user then has the option of storing the report for later use, printing the report, displaying the report on the computer screen, or employing any combination of those options. If the recipient is using a third party system, the report is accepted by that system and printed for transmittal to the end user; i.e., the requestor of the credit report.

Appropriate software must be installed at the end user's (or third party's) facility. This software has several functions.

First, a form or screen is presented on the user's computer monitor. This screen prompts the user for each piece of needed applicant data. A full set of Help screens is available should any confusion develop while writing data to the screen.

A second function of the software is communications. The applicant data must be transmitted to data processing facility 22, and the reports produced by that data processor must be returned. In system 20, no additional communications software is necessary. The communications software connects the subscriber's computer to phone lines 44, routes the data, carries on the necessary dialogues with the communications network 24 and data processor 22, waits for the report to be returned, and delivers it to the filing system of the user's computer 26 or 28.

Third, the software maintains an orderly filing system for the merged reports returned from central data processor 22. When an applicant's report is received by the user's computer 26 or 28, it is placed in its own unique file. This gives the user complete control of its disposition. The file may be displayed, printed, kept for future reference or deleted, all at the user's discretion.

A second, very important part of the system 20 is the data transmission network 24. As discussed above, this network is made up of: local telephone lines 42, Redi-Access, Accunet, and high speed data channel 44.

The local telephone company carries data from the modem 38 or 40 at the user's site to the telephone number provided by Redi-Access and also brings the formatted report back from central data processor 22 over that same connection.

Redi-Access provides twenty-four hour accessibility to Accunet through a telephone number which, in most cases, is a local call. Were it not for RediAccess, it would be necessary for each subscriber to maintain a leased circuit connecting it to Accunet. That would be prohibitively expensive.

Accunet collects data and other communications from subscribers all over the continental United States and Hawaii. It bundles those communications into packets of up to two hundred fifty six characters and routes them to their destined locations, here the central data processing facility 22.

The last portion of the network is direct channel 44. It is a high speed, unshared communications link between Accunet and the central data processing facility 22. The direct channel is a synchronous communications circuit capable of handling over seven thousand characters per second. It brings applicant data from Accunet and returns the formatted credit reports to the requesting client through Accunet.

When applicant data is received from a user by the central data processing facility 22, a series of activities is initiated. First, the input data is searched for repository requests. The requests may be made of only one, any two, or all three repositories. The inquiries may be joint or individual. If an inquiry is joint, the reports from each repository will be joint. If the inquiry is individual, all reports will be individual. When the user makes no selections, data processing facility 22 will select the repositories based on preferences made at setup time and on the zip code of the applicant. The inquiry made to the first repository will be joint and the second and third inquiries will be individual. If no spouse is included in the application information supplied by the user, all reports will be individual. Central data processing facility 22 will choose the repositories based on an algorithm which has grown out of extensive experience in the nationwide credit market.

Once the repositories are determined, the applicant information is formatted for each of the repositories. Facility 22 then requests credit report(s) from the appropriate repositories and waits for their responses.

Normally, in under two minutes and in many case just over one minute, the repositories will have processed the requests and returned reports to facility 22. This data processing facility must then put the report data into a standard format and begin the search process for duplicate entries.

Computer 22 thus compares each credit report entry, searching for duplicates. The comparison is quite exhaustive, requiring not just one or two matching elements but several to call the entry a duplicate. Once it is determined that a duplicate exists, the duplicate entries are merged into single entries consisting of the most accurate data from each version of the entry. For example, one version of a trade might show a high balance of $125,000 while another might show $124,950. The $124,950 figure would be selected as the more accurate and included in the formatted report.

After the reports have been screened for duplicates, all of the reports are merged into a single report and so reformatted as to be readable either by the human eye or by computer.

After final formatting, the report is first sorted by applicant. For example, the applicant may be a couple, John and Mary. John has applied as the applicant, and Mary has applied as applicant's spouse. The trades belonging to John will be listed first. Those belonging to Mary will be listed second. And, finally, there will be shown those trades which do not match either name well but are identified with the social security number of at least one of the applicants. Within each of these groups, the trades will be listed in descending order of balance.

Typically, the reports will initially be produced in a format which is printable as received and readable by the human eye. The report data may be written to a file or passed through directly to a printer.

Specifications

This section of the detailed description deals with: (1) the protocols for contacting and passing information to central data processing facility 22; (2) the data output format provided by central data processing facility 22; and (3) error codes employed to unravel those odd cases where things don't go right.

Standards

Quotation marks will be used to set off a string of characters which must be used specifically. For example, "ATDT" as a Hayes command means "send the modem the letters ATDT". The symbol n when repeated and found within quotation marks will be used to indicate any numerals from 0 to 9 where it is appropriate that a numeral must be used but that it may be any number. For example, the Hayes dialing sequence "ATDTnnnnnnn" means the letters ATDT followed by any seven digit telephone number. The symbol <cr> will always mean a carriage return—hex value 0D. The new line character, hex value 0F, will be indicated by <nl>. The <nl> character is used by host computer 22 to delimit its own transmitted lines. Where any alphanumeric character is acceptable, a lower case x will be used. For example, when logging into Accunet, "NET xxxx" means the word "NET" followed by four variable characters. A form feed—hex value 0C—will be represented by the symbol <ff>. Column numbers will begin with column as the leftmost printable column on a page. Line 1 will be considered to be the first printable line on a page.

System Topology

As discussed above and shown in FIG. 1, system 20 employs a high speed connection to the Accunet/Redi-Access X.25 public data network.

The network accepts dialup connections and relays them to central data processor 22. The data processor operates on a prime computer platform, employing a 56 kb, V.35, X.25 connection to Accunet's digital service.

The data processor employs Primenet (Prime's network products) to enable the connection to Accunet. Primenet also enables interprocess communications with the central data processing facility.

Client/Server Methodology

Data processing facility 22 uses one set of processes dedicated to the task of interfacing and supporting the end user (CLIENT). Another set of processes (acting as the SERVER) conducts the business of gathering the raw credit data (see FIG. 3).

Multiple copies of the CLIENT process, XDMAN (X12 Dialogue Manager) and the SERVER programs—XXXSV, TRWSV, and TUCSV—being carried out by data processor 22 are started up at system boot time or whenever the processes require restarting.

Client Interface

The CLIENT process interfaces directly with data processor 22 to carry out the request for a merged repository file. XDMAN utilizes the network interface subroutine, X25C, to manage the connection, X25R to receive the ANSI X12 dialogue transactions, and X25T to transmit responses to the end user.

XDMAN utilizes the repository controller MRDM (Multiple Repository Dialogue Manager) to manage simultaneous repository dialogues with the repository servers, TRWSV, TUCSV, and XXXSV. XDMAN utilizes the called subroutine CDMM (Credit Data Merge Manager) to merge the repository data and CRFH (Credit Report Format Handler) to format the output in the desired media.

Session Life Cycle

When a request is presented, it is in the form of a network connection. Once connected, XDMAN begins a session life cycle that is terminated by the recognition of a disconnect or by no requests within a predetermined period of time.

Within the session life cycle, ANSI X12 segments are received. These segments are edited by the subroutine AXIE (ANSI X12 Input Editor), using an X12 rules table in common shared memory. Positive and negative acknowledgements are transmitted back to the user via the X12 acknowledgement subroutine AXAN (ANSI X12 Acknowledge/Negative Acknowledge).

When a valid CRO (Credit Report Order) segment is received, XDMAN chooses the repositories and formats the inquires for each of the repository servers. MRDM manages concurrent dialogues with the repository servers.

When results are returned, MRDM notifies XDMAN. XDMAN then calls merge subroutines and format subroutines to combine the heterogeneous data elements. Once it is complete, XDMAN transmits the response to the end user and logs the transaction. The session life cycle is then continued until expiration.

Client Interface Pseudo Code

```
0.0     XDMAN-MAIN-LOGIC
        DO 1.0 HOUSEKEEPING
        DO 2.0 PROG-CONTROL-LOGIC UNTIL AN
        ABNORMAL CONDITION OCCURS
        DO 3.0 EOJ-LOGIC
0.0     XDMAN-MAIN-LOGIC-END
1.0     HOUSEKEEPING
        OPEN FILES
1.0     HOUSEKEEPING-END
2.0     PROG-CONTROL-LOGIC
        DO 2.1 GET-A-CONNECTION
        DO 2.2 INITIALIZE-SESSION
        DO 2.3 SESSION-CONTROL-LOGIC UNTIL
        SESSION-LIFE-
CYCLE ENDED
2.0     PROG-CONTROL-LOGIC-END
2.1     GET-A-CONNECTION
        CALL 'X25C'
        IF CONNECTION-FAILED
        THEN
            FLAG AN ERROR AND TERMINATE THE
            SESSION-LIFE-CYCLE
        END-IF
2.1     GET-A-CONNECTION-END
2.2     INITIALIZE-SESSION
        CALL 'AXAN' TO SEND INITIAL
        ACKNOWLEDGEMENT
2.2     INITIALIZE-SESSION-END
2.3     SESSION-CONTROL-LOGIC
        DO 2.3.1 GET-VALID-ORDER UNTIL A VALID CRO
        SEGMENT IS FOUND
        DO 2.3.2 PROCESS-REPORT-REQUEST
        DO 2.3.3 PROCESS-REPORT-OUTPUT
2.3     SESSION-CONTROL-LOGIC-END
2.3.1   GET-VALID-ORDER
        CALL 'X25R' TO RECEIVE A SEGMENT
        CASE-IF X25R-RETURN-CODE
            IF DATA-RECEIVED
            DO 2.3.1.1 EVALUATE-SEGMENT
            IF NETWORK-ERROR
            DO 2.3.1.2 NETWORK-ERROR
            IF DISCONNECT
            DO 2.3.1.3 RECOGNIZE-DISCO
            IF TIME-OUT
            DO 2.3.1.4 GENERATE-DISCO
        CASE END
2.3.1   GET-VALID-ORDER-END
2.3.1.1 EVALUATE-SEGMENT
        CALL 'AXIE' TO EDIT THE INPUT
        ANSI X12 SEGMENT
        CALL 'AXAN' TO POSITIVELY
        ACKNOWLEDGE THE
        SEGMENT IF ERROR FREE
            OR NEGATIVELY ACKNOWLEDGE THE
            SEGMENT IF IN ERROR
2.3.1.1 EVALUATE-SEGMENT-END
2.3.1.2 NETWORK-ERROR
        CALL 'X25C' TO CLEAR THE CONNECTION
        SET SESSION-LIFE-CYCLE AS ENDED
2.3.1.2 NETWORK-ERROR-END
2.3.1.3 RECOGNIZE-DISCO
        SET SESSION-LIFE-CYCLE AS ENDED
2.3.1.3 RECOGNIZE-DISCO-END
2.3.1.4 GENERATE-DISCO
        CALL 'X25C' TO CLEAR THE CONNECTION
        SET SESSION-LIFE-CYCLE AS ENDED
2.3.1.4 GENERATE-DISCO-END
2.3.2   PROCESS-ORDER-REQUEST
        DO 2.3.2.1 SETUP-SERVER-INTERFACE
        DO 2.3.2.2 GET-REPOSITORY-DATA
        DO 2.3.2.3 MERGE-REPOSITORY-DATA
2.3.2   PROCESS-ORDER-REQUEST-END
2.3.2.1 SETUP-SERVER-INTERFACE
        BUILD INQUIRIES FOR THE REPOSITORY SERVERS
        BASED UPON WHICH REPOSITORIES WERE
        CHOSEN OR WHICH REPOSITORIES
        BEST COVER THE CONSUMER ZIP CODE
2.3.2.1 SETUP-SERVER-INTERFACE-END
```

-continued

Client Interface Pseudo Code

```
2.3.2.2 GET-REPOSITORY-DATA
        CALL 'MRDM' REGAINING CONTROL WHEN
        ALL SERVERS HAVE
        COMPLETED OR TIMED OUT BASED UPON A
        PREDETERMINED TIMEOUT VALUE
2.3.2.2 GET-REPOSITORY-DATA-END
2.3.2.3 MERGE-REPOSITORY-DATA
        CALL 'CDMM' MERGING THE DATA AND PLACING
        IT IN VIRTUAL MEMORY
2.3.2.3 MERGE-REPOSITORY-DATA-END
2.3.3.  PROCESS-REPORT-OUTPUT
        DO 2.3.3.1 FORMAT-OUTPUT-REPORT
        DO 2.3.3.2 TRANSMIT-OUTPUT-REPORT
2.3.3   PROCES-REPORT-OUTPUT-END
2.3.3.1 FORMAT-OUTPUT-REPORT
        CALL 'CRFH' TO FORMAT THE DATA IN VIRTUAL
        MEMORY INTO THE DESIRED
        CREDIT REPORT FORMAT
2.3.3.1 FORMAT-OUTPUT-REPORT-END
2.3.3.2 TRANSMIT-OUTPUT-REPORT
        CALL 'X25T' TO TRANSMIT THE FORMATTED
        REPORT BACK TO THE USER
2.3.3.2 TRANSMIT-OUTPUT-REPORT-END
3.0     EOJ-LOGIC
        CLOSE FILES
3.0     EOJ-LOGIC-END
```

REPOSITORY ACCESS SERVER

Server Interface

The server processes CBISV, TRWSV and TUCSV are fundamentally the same. Therefore, they are referred to herein singularly as XXXSV. The server XXXSV accepts network requests from the MRDM. XXXSV services theses requests via performing dialogues and retrieves fixed format credit report data from the repositories via the direct telecommunication connections 46, 48, and 50.

Session Lifecyle

XXXSV uses Primenet IPCF (Inter Process Communications Facility) to communicate with MRDM as shown in FIG. 3. XXXSV expects to receive repository access instructions and information from MRDM. XXXSV will first check to see if the file preexists in the preexisting credit file XXXPCF. If it exists, XXXSV returns it to MRDM with status indicating so.

If the file cannot be found, XXXSV institutes repository communications dialogues. These dialogues use supplied subscriber information and search keys. When the file is returned, it is placed in the XXXPCF, using an uniquely constructed key. Once the data is returned to MRDM, the session between the server and MRDM is terminated. The server is then ready to accept a session from the same client or another client, and the session lifecycle begins again.

XXXSV uses X25C, X25R and X25T to manage the IPCS communications. Repository specific dialogue steps are isolated in routines defined as SCENES. The communications with CBI, for example, begin with a DIAL segment as SCENE 2 and conclude with the IDNT segment in SCENE 3. SCENE is reserved for a telecommunications recovery step, if a step of that character is deemed necessary.

Server Interface Pseudo Code

```
0.0     MAIN-LOGIC
        DO 1.0 HOUSEKEEPING
```

| Server Interface Pseudo Code | |
|---|---|
| | DO 2.0 PROCESS-LOGIC UNTIL AN ABNORMAL CONDITION OCCURS |
| | DO 3.0 EOJ-LOGIC |
| | STOP RUN |
| 0.0 | MAIN-LOGIC-END |
| 1.0 | HOUSEKEEPING |
| | OPEN FILES |
| 1.0 | HOUSEKEEPING-END |
| 2.0 | PROCESS-LOGIC |
| | DO 2.1 GET-INPUT-REQUEST |
| | DO 2.2 RETRIEVE-BUREAU-DATA |
| | DO 2.3 RETURN-BUREAU-DATA |
| | DO 2.4 UPDATE-OUTPUT-FILES |
| | END-IF |
| 2.0 | PROCESS-LOGIC-END |
| 2.1 | GET-INPUT-REQUEST |
| | DO 2.1.1 GET-A-CONNECT |
| | DO 2.1.2 GET-A-REQUEST |
| 2.1 | GET-INPUT-REQUEST-END |
| 2.1.1 | GET-A-CONNECT |
| | CALL 'X25C' WAITING ON A CONNECTION FROM MRDM |
| 2.1.1 | GET-A-CONNECT-END |
| 2.1.2 | GET-A-REQUEST |
| | CALL 'X25R' TO GET THE INQUIRY DATA FROM MRDM |
| 2.1.2 | GET-A-REQUEST-END |
| 2.2 | RETRIEVE-BUREA-DATA |
| | DO 2.2.1 GET-PRE-EXIST |
| | IF THE FILE DOES NOT ALREADY EXIST |
| | THEN |
| |     DO 2.2.2 BUREAU-ACCESS-DIALOGUE |
| | END-IF |
| 2.2 | RETRIEVE-BUREAU-DATA-END |
| 2.2.1 | GET-PRE-EXIST |
| | READ XXXPCF USING THE UNIQUE KEY PASSED FROM MRDM |
| 2.2.1 | GET-PRE-EXIST-END |
| 2.2.2 | BUREAU-ACCESS-DIALOGUE |
| | DO 2.2.2.1 SCENE-1 |
| | DO 2.2.2.2 SCENE-2 |
| | DO 2.2.2.3 SCENE-3 |
| 2.2.2. | BUREAU-ACCESS-DIALOGUE-END |
| 2.2.2.1 | SCENE-1 |
| | CALL 'XXX1' TO ASSURE THE TELECOMMUNICATIONS EXISTS |
| 2.2.2.1 | SCENE-1-END |
| 2.2.2.2 | SCENE-2 |
| | CALL 'XXX2' TO PERFORM THE INITIAL DIALOGUE STEP |
| 2.2.2.2 | SCENE-2-END |
| 2.2.2.3 | SCENE-3 |
| | CALL 'XXX3' TO REQUEST AND RETRIEVE THE CREDIT DATA |
| 2.2.2.4 | SCENE-3-END |
| 2.3 | RETURN-RETRIEVED-DATA |
| | DO 2.3.1 SEND-DATA |

| Server Interface Pseudo Code | |
|---|---|
| 2.3 | RETURN-RETRIEVED-DATA-END |
| 2.3.1 | SEND-DATA |
| | CALL 'X25T' TO RETURN THE DATA TO MRDM |
| 2.3.1 | SEND-DATA-END |
| 2.4 | UPDATE-OUTPUT-FILES |
| | IF THE FILE DID NOT PREEXIST |
| | THEN |
| |     WRITE XXXPCF FILE USING A UNIQUE KEY |
| | END-IF |
| 2.4 | UPDATE-OUTPUT-FILES-END |
| 3.0 | EOJ |
| | CLOSE FILES |
| 3.0 | EOJ-END |

Accunet Communications Protocol

Accunet is autoparity and autobaud over the range 300 to 2400 bits per second at Micro-Com networking level 4. For the purposes of this specification, Micro-Com level 4 means the circuit corrects any errors encountered as a part of the transmission of the data. The software employed in central data processing facility 22 (hereinafter referred to as "Instant Merge") supports, but does not require, X-ON/X-OFF handshaking for flow control. That software does not support BREAK.

The communications protocol conforms to the EDI ANSI X12 proposed standard. The purpose of the X12 standard is to define the control structures used in the electronic interchange of business information. The standard provides the interchange envelope of a header and trailer for the electronic interchange through a data transmission. It also provides a structure to acknowledge the receipt and processing of the envelope.

In general, an X12 transmission consists of several data segments analogous to records in a file. Within each segment are several data elements, each analogous to a field within a record. The generalized format of an X12 dialogue will contain an interchange header (Instant Merge's ST segment) followed by any optional interchange related control segments (Instant Merge uses none), followed by the data in functional groups (Instant Merge's REF and CRO segments), with the interchange trailer (Instant Merge's SE segment) following the data. The dialogue is completed by an acknowledgement segment returned to the sender. Instant Merge returns an acknowledgement segment following each segment from the sender. If there is no response from Accunet, the sequence should be repeated.

Table 1 below contains a more detailed view of the ST, REF, SE, AKO, AK3 and AK4 segments.

TABLE 1

Segment Schematics

ST *999*1234<cr>

| No. | Element Name | Mand/Opt. | Data type | Min | Max | Comments |
|---|---|---|---|---|---|---|
| 1 | Transaction ID code | M | ID | 3 | 3 | Any value |
| 2 | Trans. control No. | M | AN | 4 | 9 | Any value |

REF*IT*00112345X APPLES IMS*DOWNTOWN BRANCH<cr>

| 1 | Ref. No. Qualifier | M | ID | 2 | 2 | "IT" |
|---|---|---|---|---|---|---|
| 2 | Reference Number | M | AN | 21 | 21 | See text |
| 3 | Description | O | AN | 1 | 80 | See text |

SE *23*1234<cr>

| 1 | Number of Segments | M | NO | 1 | 6 | See text |
|---|---|---|---|---|---|---|
| 2 | Trans. control no. | M | AN | 4 | 9 | See text |

TABLE 1-continued

```
AK0<nl>
AK3*CRO*999**9<nl>
```

| | | | | | | |
|---|---|---|---|---|---|---|
| 1 | Segment ID | M | NO | 1 | 6 | See text |
| 2 | Segment Number | M | NO | 1 | 6 | See text |
| 4 | Reason Code | O | ID | 1 | 3 | See text |

```
AK4*36*725*1<nl>
```

| | | | | | | |
|---|---|---|---|---|---|---|
| 1 | Element Position | M | NO | 1 | 2 | See Text |
| 2 | Element Ref. Number | M | NO | 1 | 3 | |
| 3 | Reason Code | O | AN | 1 | 99 | See Text |

Connection Sequence

Referring now to FIG. 2, the first step in the data input dialogue is to secure a connection with Redi-Access. This begins with a dialing sequence. If the initiating modem 38 or 40 is Hayes compatible, the dialing sequence "ATDTnnnnnnn<cr>" is used. If the initiating modem is not Hayes compatible, that procedure specified by the manufacturer which will make the connection with RediAccess is employed. After answering, Redi-Access will place a carrier on the line. When the modem detects the carrier, Hayes compatible models will return the word "CONNECT" to initiating CPU. To trigger the autobaud, the initiating CPU should transmit ". . . <cr>". Approximately one second should elapse between the transmission of each period. The response will be the Accunet account banner.

Routing

Next, routing information is issued to Accunet. A maximum of thirty eight seconds is allowed for this task after the appearance of the banner. The routing order is "CREDIMG,,PID=COO1".
Accunet will respond with:
"COM<cr>
TRANSFER DTE".
Accunet then makes the connection with central data processing facility 22 and reports back with an AKO. At this point, the user (or requester of credit information) is connected to central data processor 22.

X12 Dialogue

At that point, the actual X12 dialogue is begun. First, the initiating CPU transmits a header, "ST *123*1234*<CR>". In this as in all other X12 segments, the * character could be replaced by any other character. Its presence in the fourth position defines it as the delimiter. The three digit element shown in FIG. 2 as "123" is the transaction set control number. The information contained within these elements is important only inasmuch as the elements are required by the ANSI X12 standard.

Central data processing facility 22 will respond with "AKO", "AK3", or "AK4". "AKO" indicates a positive acknowledgement and has only one associated element. That element is not mandatory and is currently unused. AK3 and AK4 are negative acknowledgements. An AK3 return indicates a bad segment.

The format is "AK3*xxx*nnnn**n". The alphanumeric element contains the segment ID code such as ST, REF, or CRO. The first of the two numeric elements contains the current sequence number in the transaction set, a number from 1 to 1002. Here, as in all variable numeric elements, the element is fixed by padding to the left with zeros. The second numeric element contains a code from 1 to 3 identifying the fault encountered. A "1" indicates an unknown segment type—for example, if "SU" rather than "ST" had been mistakenly sent. A "2" indicates that a prerequisite segment was missing. For example, as is discussed below, a CRO segment must be preceded by a REF segment which must be preceded by an ST segment. If a "3" is found as the segment failure code, it indicates that there are too many occurrences of this segment For example, there may only be one ST segment and there may be only 999 CRO segments.

If an AK4 is received, a data element error is indicated. The format is "AK4*nn*nnnn*n*". The first numeric element contains a number from 1 to 36 identifying the position of the data element within the segment. The segment identifier is not included in the count. The second numeric element contains the X12 data element reference number. Using this number, the data element in question may be referenced in the X12 Data Element Dictionary. The last numeric element contains the data element error code. Four possible codes are used in data processor 22. If the code is a "1", it indicates that a required element is missing. If the code is a "4", too few characters were placed in the element. If the code is a "5", too many characters were placed in the element If the code is a "7", the wrong sort of data was placed in the element.

Irrespective of whether an AKO, a positive acknowledgement, or one of the negative acknowledgements, AK3 or AK4, is received, the line will be terminated with a <nl>. The transmission is then terminated with an X-ON. In other words, each of the lines to data processor 22 is terminated with a <nl>; and each transmission is terminated with an X-ON.

REF Segment

The next segment to be transmitted is the REF segment. The REF segment contains the user (or customer) information needed to maintain system security and for filling. The format is "REF-*IT*xxxxxxxxxxxxxxxxxxxxx*xxxxxxxxxxxxxxxxxxxxx-xxxxxxxxx xxxxxxxxxxxxxxxxxxxxxxxxxxxxxxxxxxxxxxxxxxxxx-xxx<nl>". The element "IT" indicates that the number to follow is an internal customer number The first alphanumeric element of 21 characters is made up of a two digit region code, an eight digit subscriber code, an eight digit subscriber password, and a three digit origin The second alphanumeric element describes the type of user. Data processor 22 responds to the customer information REF segment with an AKO, an AKI, or an AK4.

CRO Segment

Next comes the CRO (credit report order) segment (see Table 2 below).

"SR" for senior, 2 for second, 3 for third, and 4 for fourth.

Element #7 contains the applicant's social security number. It is a mandatory nine digit numeric element.

TABLE 2

CRC Element Table

```
CRO*F1*CMMNTS*LASTNME*FIRSTNAME*MIDNAME*JR*123121234*121212*NM*1234*
STNAME*AV*N*1*CITY*ST*12312*US*SPSNM*
SPFNAM*SMNAM*JR*123121234*121212*NM*123*STREET*AV*N*10*CITY*ST*12345*US*12
```

Figure 4:
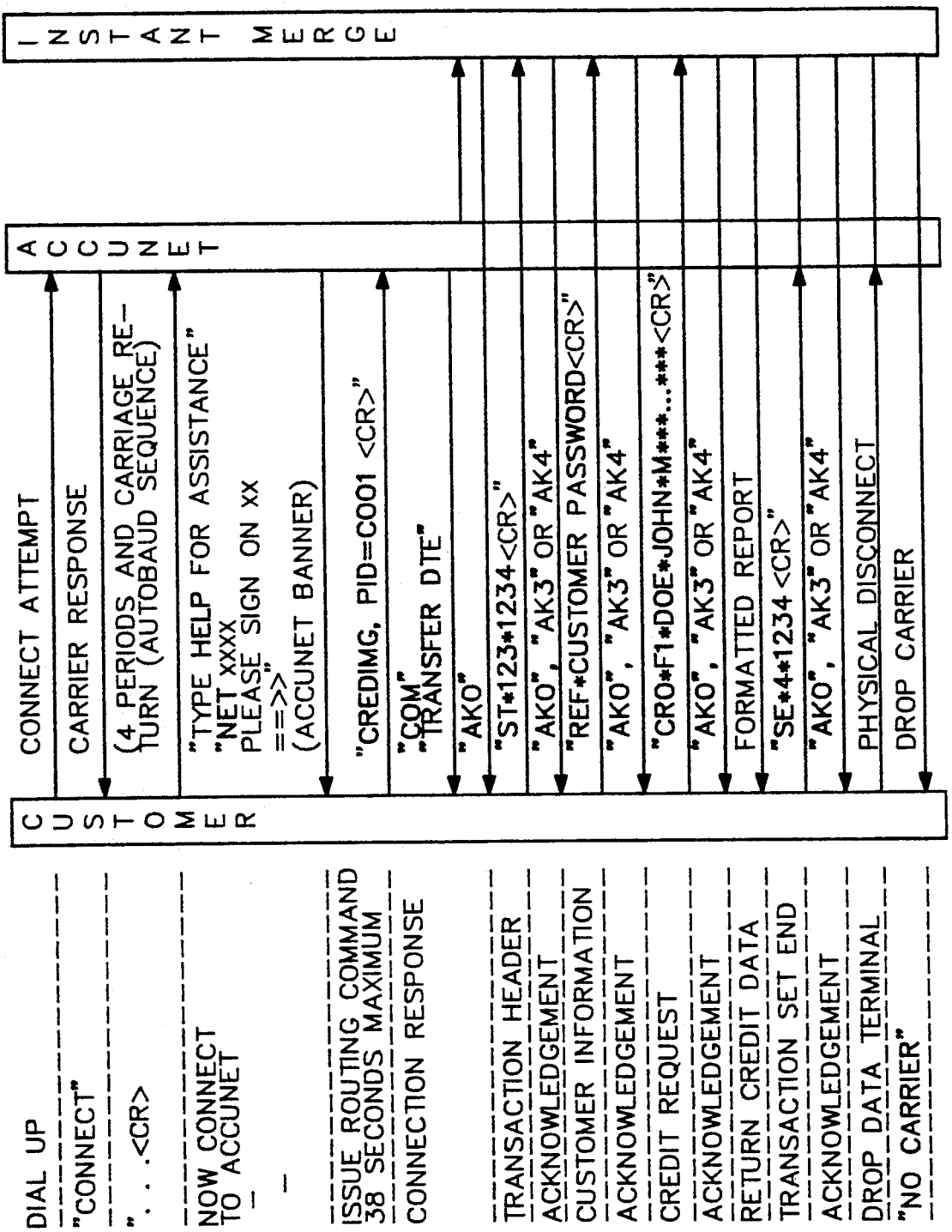
FIG. 4 depicts the flow of data in the system shown in FIG. 1.
Figure 5:
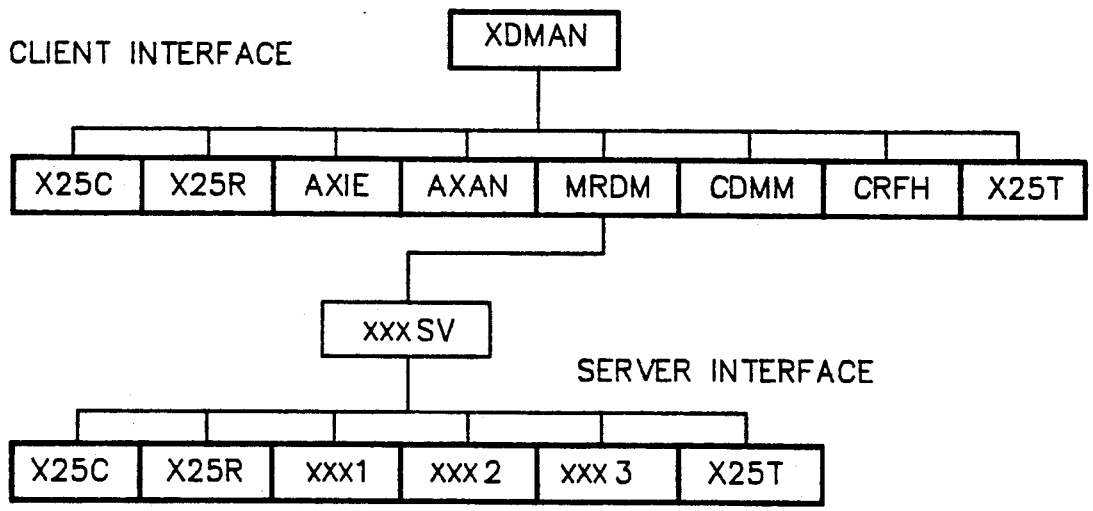
FIG. 5 pictorially depicts the client-server relationship provided by the system of FIG. 1.
Figure 6:
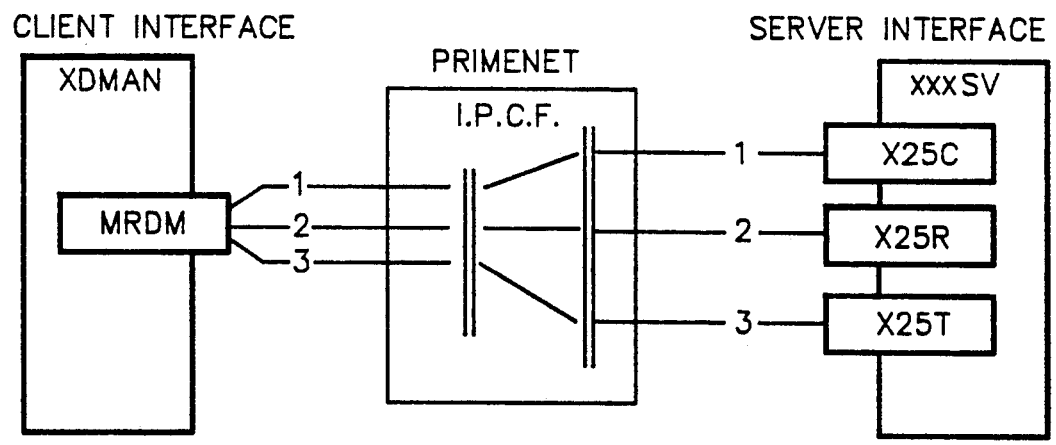
FIG. 6 is a pictorial representation of an interprocess communications facility employed in the system.

| NO. | ELEMENT NAME | MAND/OPT | DATA TYPE | MIN | MAX | COMMENTS |
|---|---|---|---|---|---|---|
| 1 | Report format | M | ID | 1 | 2 | "F1" |
| 2 | Free-form description | O | AN | 2 | 20 | |
| 3 | Surname | M | AN | 1 | 35 | First 18 used |
| 4 | First name | M | AN | 1 | 35 | First 10 used |
| 5 | Middle name | O | AN | 1 | 35 | First 10 used |
| 6 | Generation | O | AN | 1 | 2 | |
| 7 | Social Security Number | M | NU | 9 | 9 | |
| 8 | Date of birth/age | O | DT | 6 | 2 | |
| 9 | Address type | M | ID | 1 | 35 | |
| 10 | House/box number | M | AN | 1 | 35 | |
| 11 | Street name/route number | O | AN | 1 | 35 | |
| 12 | Type of thoroughfare | O | AN | 1 | 35 | FIG. 4 |
| 13 | Direction | O | AN | 1 | 35 | FIG. 4 |
| 14 | Apartment number | O | AN | 1 | 20 | |
| 15 | City name | M | AN | 2 | 19 | |
| 16 | State/province code | M | ID | 2 | 2 | |
| 17 | Zip code | M | ID | 5 | 9 | |
| 18 | Country code | O | ID | 2 | 2 | |
| 19 | Spouse's surname | O | AN | 1 | 35 | First 18 used |
| 20 | Spouse's first name | O | AN | 1 | 35 | First 10 used |
| 21 | Spouse's middle name | O | AN | 1 | 35 | First 10 used |
| 22 | Spouse's generation | O | AN | 1 | 35 | |
| 23 | Spouse's Soc. Sec. No. | O | AN | 1 | 30 | |
| 24 | Spouse's date of birth/age | O | DT | 6 | 6 | |
| 25 | Former address type | O | ID | 1 | 2 | |
| 26 | Former house/box number | O | AN | 1 | 35 | |
| 27 | Former street name/rt. no. | O | AN | 1 | 35 | |
| 28 | Former thoroughfare type | O | AN | 1 | 35 | FIG. 4 |
| 29 | Former direction | O | AN | 1 | 35 | FIG. 4 |
| 30 | Former apartment number | O | AN | 1 | 35 | |
| 31 | Former city | O | AN | 2 | 19 | |
| 32 | Former state | O | ID | 2 | 2 | |
| 33 | Former zip | O | ID | 2 | 9 | |
| 34 | Former country | O | ID | 2 | 2 | |
| 35 | Repository overrides | O | AN | 1 | 30 | |
| 36 | Individual/joint | O | AN | 1 | 3 | |

Up to 999 CRO segments may be sent. Each is followed by its own AKO, AK3, or AK4 and its own report. The CRO segment contains up to 36 data elements. Some elements are mandatory, while some are optional. Any unused elements prior to the last element used must be set off by delimiters to account for their locations.

Element #1 requests the report format. It is a mandatory two digit alphanumeric element. "F1" in element #requests the F1 format.

Element #2 is a free form description containing any processor's comments, loan number, etc. It is an optional element and can contain from 1 to 20 alphanumeric characters.

Element #3 holds the credit applicant's surname. It is a mandatory element and may contain from 1 to 35 alphanumeric characters. Only the first 18 characters are used in that exemplary application of the invention disclosed herein.

Element #5 contains the applicant's middle name. It is an optional element and contains from 1 to 35 characters. Only the first 11 characters are used in that exemplary application of the invention disclosed herein.

Element #6 contains the generation of the applicant's name. It is an optional element and may contain 1 or 2 characters. Instant Merge will accept the following codes in this element: "J" or "JR" for junior, "S" or "SR" for senior, 2 for second, 3 for third, and 4 for fourth.

Element #7 contains the applicant's social security number. It is a mandatory nine digit numeric element.

Element #8 contains the applicant's age or birthday. It is an optional, six digit, numeric element. The data may be entered in any of three formats. If the applicant's age is to be used, it may be entered as the first two digits of the element. If the entire date of birth is to be entered, it should be entered MMDDYY with no separators. If only the month and year are used, they may be entered as MMYY beginning at the leftmost position in the element.

Element #9 contains the address type. It is a mandatory alphanumeric element which may be either 1 or 2 digits long. It accepts four possible codes. "NM" indicates normal. "PB" designates a post box. "RR" is for a rural route. And "SR" stands for Star Route.

Element #10 contains the house or box number. It is a mandatory alphanumeric element and can contain from 1 to 6 characters. If element #9 contains "NM", then element #10 contains the house number. If element #9 contains "PB", "RR", or "SR", then element #10 contains the box number.

Element #11 contains the applicant's street name or route number. It is an optional alphanumeric element containing from 1 to 35 characters. If element #9 contains "NM", element #11 should contain the street name. If element #9 contains "RR" or "SR", then element #11 should contain the route number. If element #9 contains "PB", element #11 is ignored.

Element #12 hold the thoroughfare type. It is an optional, alphanumeric element containing from 1 to 35 characters.
Valid values are listed in Table 3 below.

TABLE 3

| Thoroughfare types | |
|---|---|
| AV = AVENUE | PL = PLACE |
| BV = BOULEVARD | PY = PARKWAY |
| CI = CIRCLE | PZ = PLAZA |
| CT = COURT | RD = ROAD |
| DR = DRIVE | SO = ROW |
| EX = EXPRESSWAY | SQ = SQUARE |
| FR = FREEWAY | ST = STREET |
| HY = HIGHWAY | TE = TERRACE |
| LN = LANE | TR = TRAIL |
| PI = PIKE | WY = WAY |
| Direction Codes | |
| N = NORTH | NE = NORTHEAST |
| E = EAST | NW = NORTHWEST |
| S = SOUTH | SE = SOUTHEAST |
| W = WEST | SW = SOUTHWEST |

Element #13 holds the direction. It is an optional alphanumeric element of from 1 to 35 characters (see Table 3 for valid values).

Element #14 holds an apartment number. It is an optional, alphanumeric element of from 1 to 35 characters. If element #9 hold "PB", element #14 is ignored.

Element #15 holds the name of the city in which the applicant lives. It is a mandatory alphanumeric element containing 2 to 19 characters.

Element #16 holds the name of the state or province in which the applicant lives. It is a mandatory two digit element The standard Postal Service state or province abbreviations are accepted.

Element #17 holds the applicant's zip code. It is a mandatory alphanumeric element holding from 5 to 9 characters.

Element #18 holds the applicants country code. It is an optional two digit alphanumeric element. Valid codes may be any two letter country abbreviation used by the Postal Service Element #19 contains the applicant's spouse's surname. It is an optional, alphanumeric element containing from 1 to 35 characters. Only the first 18 characters are used.

Element #20 contains the applicant's spouse's first name. It is an optional, alphanumeric element containing from 1 to 35 characters. Only the first 10 characters are used.

Element #21 contains the applicant's spouse's middle name. It is an optional, alphanumeric element containing from 1 to 35 characters. Only the first 10 characters are used.

Element #22 contains the generation of the applicant's spouse's name. It is an optional, alphanumeric element containing from 1 to 35 characters. Instant Merge accepts the same codes as it does for element #6.

Element #23 contains the applicant's spouse's social security number. It is an optional, alphanumeric element containing 9 digits.

Element #24 contains the applicant's spouse's date of birth or age. It is an optional element containing six characters and is similar to element #8.

Element #25 contains the applicant's former address type and is an optional element similar to element #9.

Element #26 contains the applicant's former house or box number. It is an optional element similar to element #10.

Element #27 contains the applicant's former street name or route number. It is an optional element similar to element #11.

Element #28 contains the applicant's former thoroughfare type. It is an optional element similar to element #12.

Element #29 contains the applicant's former direction code. It is an optional element similar to element #13.

Element #30 contains the applicant's former apartment number. It is an optional element similar to element #14.

Element #31 contains the applicant's former city name. It is an optional element similar to element #15.

Element #32 contains the applicant's former state abbreviation. It is an optional element similar to element #16.

Element #33 contains the applicant's former zip code. It is an optional element similar to element #17.

Element #34 contains the applicant's former country code. It is an optional element similar to element #18.

Element #35 contains repository choices which both override selections made when the customer account was initialized and those based on the zip code of the applicant. It is an optional, alphanumeric element containing from 1 to 30 characters. The element may contain the overriding repository names and the order of search. For example, "TRW, CBI, TUC" would first search TRW, then CBI, and finally TUC for records on this applicant. Or, it may contain a count from 1 to 3. This count would control the number of repositories searched, but the specific repositories and their search order would be left to the Instant Merge or other software running in central data processing facility 22. If there is no entry in element #35, the data processor bases its search order on the applicant's zip code and experience in the credit industry. It will select the best repositories to search as well as the best order.

Element #36 contains the individual/joint application code. It is an optional, alphanumeric element containing one character. If the element contains "I", all inquiries for this applicant will be treated as individual inquiries. If the element contains "J", all inquiries for this applicant will be treated as joint inquiries. If there is no entry in this element, the first inquiry is joint with the remaining inquiries being made as individual inquiries.

Formatted Reports

Following the transmission of each CRO segment, data processor 22 responds with an AKO, an AK3, or an AK4. It then requests the reports from the repositories, merges the reports, and delivers the formatted report to the user. The sequence of CRO, AKO, and formatted report can be repeated up to 999 times. After the last report has been received, the user should send an SE segment. The format is "SE*nnnn*nnnn". The first numeric element contains the count of transmitted segments including the ST and the SE. The second numeric element must match the transaction set control number found in the ST. Central data processing facility 22 responds with an AKO, AK3, OR AK4.

Disconnection

The entire process from ST through SE may be continued as many times as is necessary to secure all the reports desired without disconnecting from the network. Once it is no longer necessary to remain connected, disconnection is accomplished by dropping the Data Terminal Ready term to the modem. The modem will thereupon physically disconnect from the line. Hayes compatible modems then send the massage "NO CARRIER" to the initiating computer (26 or 28 in system 20).

Output Format

Presently employed format F1 is formatted for an 80 column wide printer and to be read by the human eye. The format occupies a maximum of 78 characters per line plus the <cr>. A maximum of 64 lines per page will be transmitted followed by a <ff>. Table 4 below contains a sample of the F1 output format.

TABLE 4

Credit Report, F1 Format

```
CREDCO INSTANT MERGE CREDIT REPORT                    Reference: 1-23456-789012-345
Sub: LASTNAME**********, FIRST****** MIDDLE***** JR      Ssn: 123-45-6789 Age: XX
Sps: LASTNAME**********, FIRST****** MIDDLE*****         Ssn: 123-45-6789 Age: XX
Curr Addr: 123456 NW ASTREETNAME****, CITY****************, ST 12345
Account Name/Number (bureaus)                                 Past Due      Last
     Open     High    Pymt Balance    MOP     Status   Rptd  30 60 90+  MR  Diq
Accounts under subject:
JC PENNEY / 123456-2345 (TRW, TUC)
    A 10-87   500     REV 125         R-9   COLL/P&L  10-89  00 08 12  24  2-89
    Hist: 10-89 111111113113313311
    Closed to further use
TRADENAME**********************/20****************** (TRW, TUC, CBI)
    X 10-87 *****500 ***REV *****345  R-1   COLL/P&L  10-89  00 00 00  24  9-89
    Payment pattern ********************
    Any footnotes ******************
Possible Non-Applicant Accounts:
TRADENAME**********************/20****************** (TRW, TUC, CBI)
    X 10-87 *****500 ***REV *****345  R-1   COLL/P&L  10-89  00 00 00  24  9-89
    Payment pattern ********************
    Any footnotes ******************
END OF REPORT
```

Lines one and three are rows of hardcoded hyphens. The second line contains the title of the report as well as the report's reference number. The reference number is generated by central data processor 22, is unique to each report, and provides an audit trail for the data contained in the report.

Line four begins with the hardcoded characters "Sub:". The applicants name follows; it will be the name indicated in the data input even if that name is not an exact match with the repository records The name fields first contain the last name truncated to, at most, 18 characters followed by a comma. The last name is followed by the first and middle names, each containing at most eleven characters. The first and middle names are separated by a space. A space follows and then the generation code where one applies. The fields are compressed. For example, the name Albert Raymond Hovey, Jr. would appear "Hovey, Albert Raymond JR". The hardcoded characters "Ssn:" follow and then the social security number of the applicant beginning in column 59. The social security number contains the normal hyphens—for example, "123-45-6789". The hardcoded characters "Age:" begin in column 71 with the applicant's age in columns 76 and 77.

Line five duplicates line four with the exception of the first three characters which are "Sps". The information contained in the fifth line pertains to the applicant's spouse.

The sixth and seventh lines contain the applicant's residence information. Line six begins with the hardcoded characters "Curr Addr:". Line seven begins with the hardcoded characters "Prev Addr:". The address data begins in column twelve, starting with street number and continuing with direction, street name, a comma, city, a comma, state, a space and the zip code. The entire line is compressed, leaving no blank spaces other than those required for readability.

Lines 8 and 11 are hardcoded rows of hyphens. Lines 9 and 10 are hardcoded and serve to explain the fields contained below them for easy readability.

The balance of the report is broken into five categories. Each category is headed by an explanatory line followed by a partial line of hyphens to set it off to the eye. The categories are: 1) applicant's trades, 2) trades in the name of the applicant and spouse, 3) possible non-applicant accounts, 4) inquiries made within the past 180 days, and 5) public records.

Each trade begins in column 1 with the trade name. This field is variable and compressed. The trade name field is terminated by a "/" character and will not exceed thirty one characters, including the terminator. Following the trade name is an account number field. The account number fields will not exceed twenty characters, and each will be separated from the following field with a space. The last field on the first trade line specifies the repositories reporting the trade. The repository names are enclosed in parenthesis.

The second line of each trade begins in column 4 with the ECOA code. The ECOA code indicates the party responsible for the account and type of participation. Table 5 below contains the ECOA codes and their definitions.

TABLE 5

| ECOA Codes | |
|---|---|
| U UNDESIGNATED | Not designated by the creditor |
| I INDIVIDUAL | Individual account |
| J JOINT | Joint account |
| A AUTHORIZED USER | Authorized to use someone else's account |
| S SHARED | Joint account |
| C CO-MAKER | Joint responsibility for the account |
| B CO-SIGNER | Responsibility only in case of default on the account |
| M MAKER | Individual account |
| T TERMINATED | Closed account |

The date the account was opened appears in column 7. The format is MM-YY.

The high balance begins in column 13 and continues to column 20. The field is right justified and padded on the left with blanks.

Columns 25-27 contain the amount of the scheduled payment. In the case of a revolving account, or other account in which the scheduled payment varies, the amount shown is the payment as reported by the repositories; and it is based on the other data contained in the trade.

The current balance is found in columns 28-36. The field is right justified and left-filled with blanks.

Column 39 indicates the account type. Account type codes are contained in Table 6 below.

TABLE 6

| Account Types | |
|---|---|
| REV | Revolving |
| INS | Installment |
| OPN | Open, 30 day |
| MTG | Mortgage |
| CRL | Line of Credit |

Column 40 contains a hyphen. Column 41 contains the account status code with columns 43-50 containing an English language version of the status codes. Table 7 contains the status codes and their definitions (The status code is also known as the Universal Rating Code).

TABLE 7

| Universal Rating Code | |
|---|---|
| 0 | Too new to rate |
| 1 | Current |
| 2 | 30 days late |
| 3 | 60 days late |
| 4 | 90 days late |
| 5 | 120 days late |
| 6 | 150 days late |
| 7 | Wage earner plan or bankruptcy |
| 8 | Repossession or Foreclosure |
| 9 | Collection or charge off |
| U | Unrated |

The data the trade is reported is found in columns 52-56. The format is MM-YY. Past due information begins in column 59. Columns 59 and 60 indicate the number of months the account has been at least 30 days overdue. Columns 62 and 63 indicate the number of months the account has been at least 60 days overdue. Columns 65 and 66 indicate the number of months the account has been at least 90 days overdue. Columns 69 and 70 indicate the number of months reported. Columns 73-77 contain the date of the last delinquency. The format is MM-YY.

The third line of the trade contains the payment pattern. It begins in column 7 with the hardcoded characters "Hist:". Columns 13-17 contain the date of the most recent payment history entry. The payment history is contained in columns 19-42. The digits are those of the status codes applied to the payments for each of the 24 months beginning with the date contained in columns 13-17 and the 23 preceding months.

The fourth line in each trade begins in column 7 and contains any footnotes.

The report concludes with the hardcoded message " END OF REPORT".

Merge

As discussed above, it is one of the features of central data processor 22 that it is capable of merging data from two, on all three, of the national credit repositories; eliminating duplicated information, and determining the best information when the input from different repositories does not agree. The manner in which central data processor 22 operates to perform these functions is discussed below.

Determining Duplicate Entries

Each tradeline is compared in its turn to all other available tradelines. As a trade item is evaluated, it is kept, either as a duplicate or as a new tradeline. In updating permanent disk records, duplicate trades are merged, keeping the best possible information; and it this composite trade that remains.

Throughout the following part of description the terms 'incoming data' and 'existing data' are used frequently. Definitions of these are:

INCOMING—Considered the OBJECT data. This will always be the data that is being compared to the remaining information.

EXISTING—Considered the SOURCE data. This is date to which the "new" data is being compared. No merge is performed if either of the following is
1. the account number is not provided
2. the account number is COLLECTION If neither of the above conditions is found, central data processor 22 continues as follows:

STEP 1—COMPARE ACCOUNT TYPES

A. IF the incoming account type does not equal the existing account type, a new tradeline is created using the incoming data B. IF the account type is inquiry, perform INQUIRY LOGIC C. IF the account types are equal and are not inquiries, then step 2., COMPARE DATE OPEN, is performed

INQUIRY LOGIC

A. Subscriber ID's must be exact matches

B. IF the inquiry reported date is on or after the opening date of the existing trade
THEN consider inquiry a duplicate
ELSE create a new trade for the inquiry C. IF the subscriber ID's do not match THEN crate a new trade for the inquiry

STEP 2—COMPARE OPENING DATES

A. The incoming opening date is compared to the existing opening date. IF these dates are not equal, a new tradeline is created with incoming data B. IF the opening dates are equal, step 3 is performed

STEP 3—COMPARE ACCOUNT NUMBER

A. IF account numbers match, incoming (new) data is merged with existing data

B. IF the account number match is acceptable AND if high credits are not equal
THEN a new tradeline is created with incoming data
ELSE IF high credits are equal and if the accounts are from different repositories
THEN incoming data is merged with existing data
ELSE IF the accounts are from the same repository and if both have the same date reported
THEN a new tradeline is created from incoming data
ELSE incoming data is merged with existing data C. IF the account number match is close THEN IF both accounts are from the same repository
   THEN a new tradeline is created from incoming data
   ELSE IF the accounts are from different repositories and if high credits are equal
     THEN incoming data is merged with existing data
     ELSE a new tradeline will be created from incoming data
D. IF the account number match is not acceptable
   THEN a new trade is created with incoming data

B. DETERMINING BEST DATA

Once a tradeline is determined to be eligible for merging, it is necessary to establish what data will be retained from both the incoming (new) tradeline and the existing tradeline.

For each data field, incoming information is compared to existing information. In general, no assumption is made that incoming data is more recent or accurate just by the fact that it is new data. The central data processor 22 will always save the data that is most recent and most specific regardless of the source as described below.

STEP 1—REPOSITORY INFORMATION AND IDENTIFICATION

This data is treated collectively during the merge and includes:

| | |
|---|---|
| CREDITOR NAME | ACCOUNT NUMBER |
| REPOSITORY NAME | ECOA CODE (Account ownership designator) |
| SUBSCRIBER NAME | BORROWER/CO-BORROWER IDENTIFICATION |
| CREDIT ADDRESS | CATEGORY CODE (internal ECOA of the operator of system 20) |

IF the incoming category code is unknown (IDENT)
   THEN keep existing data
   ELSE IF the existing category code is unknown
     THEN keep incoming data
     ELSE use the most recent data (determined by the reported dates)

STEP 2—ACCOUNT TYPE

IF the incoming account type is blank
   THEN keep existing data
   ELSE IF the existing account type is blank
     THEN keep incoming data
     ELSE keep existing data

STEP 3—DATE OPENED

IF both dates are specific
   THEN keep incoming date opened
     ELSE IF the incoming date is specific
     THEN keep the incoming date
     ELSE keep existing date

STEP 4—HIGH CREDIT

IF both high credits are specific
   THEN keep the higher value
   ELSE IF the incoming high credit is specific
     THEN keep the incoming high credit
   ELSE IF existing high credit is specific
     THEN keep the existing high credit
     ELSE keep the higher value

STEP 5—PAYMENT HISTORY

This data includes maximum delinquency, months reviewed, payment pattern and 30/60/90 figures. IF both trades have payment patterns
   THEN Compare each month of the incoming pattern to the existing pattern
   Keep the worst case for each month
   Calculate the number of 30, 60, and 90 day lates in the merged pattern
   Compare the calculated figures to provide incoming 30/60/90 figures
   Merge the 30/60/90's, keeping the highest number of each
   Compare the existing 30/60/90 figures to the merged 30/60/90 figures
   Keep the highest number of 30, 60, and 90 day lates
ELSE Keep the provided pattern (existing or incoming)
   Compare and merge the 30/60/90 figures, keeping the highest figures for each
IF both trades provided maximum delinquency
   THEN Compare and keep the worst case
   ELSE keep the provided maximum delinquency
IF both trades provided maximum delinquency
   THEN Compare and keep the worst case
   ELSE keep the provided maximum delinquency
IF both trades provided Months Reviewed
   THEN Compare and keep the higher value (provided)
   Calculate months reviewed using the payment history
   Compare the calculated value to the provided value and keep the higher
ELSE Keep the provided value

STEP 6—MONTHLY PAYMENT

A. IF a monthly payment is provided, that payment will be used.
B. IF no payment is provided for the incoming or the existing trade, a payment is calculated based on the high credit, the terms, the balance and the account type.
C. IF the account type is installment (I) or mortgage (M) and the high credit, the terms and the balances are within specific parameters
   THEN calculate the monthly payment by dividing the high credit figure by the term
   ELSE do not calculate the payment
D. IF the account is revolving (R, C, or 0), simulate the methods-of-payment calculation used by the majority of lenders.

STEP 7—BALANCE DATA

This data includes the following:
BALANCE FIGURE
REPORTED DATE
MOP (Manner-of-payment)
BALANCE DATE
FOOTNOTES
A. IF the reported dates are equal
   THEN IF the MOP's are equal or either MOP is non-numeric
     THEN use BEST BALANCE LOGIC, keeping the numeric MOP
     ELSE IF the existing MOP is greater than the incoming MOP
       ELSE keep the incoming balance data
   ELSE IF the number of MOP's reported (based on newest reported date) equals 1

THEN IF the account type is R, C, or O
  THEN IF the incoming reported date is older than the existing reported date
    THEN keep the existing balance date
    ELSE keep the incoming balance data
  ELSE IF both MOP's equal 1 or 0
    THEN Use BEST BALANCE LOGIC ELSE
      IF the incoming reported date is older than the existing reported date
        THEN keep the existing balance data
        ELSE keep the incoming balance data
  ELSE IF the incoming reported date is older than the existing reported date
    THEN keep the existing balance data
    ELSE keep the incoming balance data B. BEST BALANCE LOGIC
IF the balances are equal
THEN keep the most recent data (based on reported dates)
ELSE IF the existing balance is "CLOSED"
  THEN keep the existing balance data
  ELSE IF both balances are numeric
    THEN IF both balances are specific
      THEN keep the most recent data ELSE keep the data obtained with the specific balance
      ELSE IF neither balance is specific
        THEN keep the data obtained with the lower balance
        ELSE keep the incoming data

C. DETERMINING EQUIVALENT VALUES

In order for the merge logic process carried out by central data processor 22 to be reliable and consistent, four separate data elements are weighed in determining duplicate tradelines. Those are:

1. TYPE COMPARISON

VALID ACCOUNT TYPES
I = installment
M = mortgage
R = revolving
C = credit line
O = open account (30 day)
INQR = inquiry
COLL = collection
During merge, the following are considered equivalent:
I = M
R = O = C
Blank = any value

2. DATE OPEN COMPARISON

The date open match criteria is as follows:
A. Exact figures equal exact figures; i.e.:
1977 = 1977
00-00 = 00-00
04-83 = 04-83
10-YR = 10-YR
B. Figures expressed as years equal figures in month-year format when the year is the same; i.e.:
1977 = 03-77
08-84 = 1984
C. Values provided as 00-00 or blank equal any other value; i.e.:
00-00 = 03-89, 07-79 etc.
blank = 04-88, 04-89 etc.
D. When provided a date in the format, '10-year', the number of years is multiplied by 12 to determine months open (120 in this case). The same is done for the specific date being used in the comparison. If the months-open calculation for the specific date is greater than or equal to 120, it is considered equal to the 10-YR open date; i.e.:
Compare open date of 02-79 to 10-YR, assuming current date is 04-89:
2-79 10-YR: 79 × 10 × 22 = 950120
04-89: 89 × 12 + 4 = 1072 − 950 = 122 > 120
Subtract 950 from 1072 to get months open from 02-79 to current date.
If the result is greater than or equal to 120, the dates open are equal.

3. ACCOUNT NUMBER COMPARISON

A. Compress consecutive zeros to a single zero.
B. Ignore dashes (−).
C. Determine the shorter account number, and use it as the source.
E. Compare characters from right to left (character for character) in the following manner: Source number = 1234a1234b Object number = 1234a1234b123c Compare the last character of the object to each character of the source starting with the first character.
C not equal to 1
C not equal to 2 etc...
IF no match is found, compare the next-to-last character in the object to the characters in the source in the same manner.
3 not equal to 1
3 not equal to 2
3 does equal 3 When a match is found, compare characters directly to the right of those just checked.
C does not equal 4
IF no match is found, compare the third character from the left in the object to the first character in the source. This process is continued until all of the characters in the object number have been checked.
IF a match is found, the process continues until the all of the available characters have been checked in the source number or until the string ends with a mismatch.
IF the string is longer than 4 characters, a percentage is determined as follows:
The number of characters in the match string × 100 is divided by the number of characters in the object.
For example:
Source number = 1234a1234b
Object number = 1234d1234b1234c

| Match string = 5 (1234) | 5 × 100 = 500 |
| Characters in object = | 14 Divided by 14 |
| | Equals = 35% |

4. HIGH CREDIT COMPARISON

IF at least one of the high credits is blank or zero
THEN consider the high credits equal
ELSE IF both high credits are greater than 9999 and the difference is less than 1000
  THEN consider the high credits equal
  ELSE IF both high credits are greater than 999 and the difference is less than 500
    THEN consider the high credits equal
    ELSE IF the difference is less than 100
      THEN consider the high credits equal
      ELSE ... do not set equal A representative credit report prepared by central data processor 22 in the manner described above appears in Table 8, which follows.

TABLE 8

Representative Credit Report

CREDCO INSTANT MERGE Credit Report  11/01/90 Ref: 0-00000-000000-000
Prepared For: Consumer Lending
Repositories: CBI-I, TRW-I, TUC-I  Notes: REF-000000000000000
Sub: SAMPLE, SAM R.  Ssn: 111-22-3333 Age: 38
Curr Addr: 2865 101st St., PORTLAND, OR 97011

| Account Name/Number (Sources) | | | | | | | Past due | | | | Last |
|---|---|---|---|---|---|---|---|---|---|---|---|
| Open | High | Pymt | Balance | MOP | Status | Rptd | 30 | 60 | 90+ | MR | Diq |

Accounts under subject:

CTX Mortgage/7400000001545808 (TRW)
| I | 08-89 | 94500 | 962 | 94458 M-1 | CURRENT | 04-90 | 00 | 00 | 00 | 02 | |
| | Hist: 04-90 | 11 | | | | | | | | | |

GMAC/342LP41 (CBI*, TUC)
| I | 11-86 | 16607 | 277 | 6920 I-1 | CURRENT | 05-90 | 01 | 00 | 00 | 35 | 02-90 |
| | Hist: 05-90 | 111211111111111111111111 | | | | | | | | | |

SECURITY PACIFIC NTL BK/542096696901 (CBI, TRW, TUC)
| I | 04-88 | 6500 | 20 | 125 R-1 | CURRENT | 05-90 | 00 | 00 | 00 | 24 | |
| | Hist: 05-90 | 111111111111111111111111 | | | | | | | | | |

DRS SVC BUREAU/(TUC*)
| I | N/A | 106 | N/A | 106 U-9 | COLL/P&L | 09-85 | — | — | — | — | |
| | COLLECTION ACCOUNT | | | | | | | | | | |
| | DT124995 | | | | | | | | | | |
| | UNPAID | | | | | | | | | | |

NORWEST FINANCIAL/601100958950 (CBI)
| I | 04-86 | 1600 | 0 | -0- R-1 | CURRENT | 05-90 | 00 | 00 | 00 | 42 | |
| | Hist: 05-90 | 11111111111111111111111 | | | | | | | | | |

FREDERICK & NELSON/52083341 (CBI, TRW, TUC)
| I | 05-86 | -0- | 0 | -0- R-1 | CURRENT | 05-90 | 00 | 00 | 00 | 41 | |
| | Hist: 05-90 | 111111111111111111111111 | | | | | | | | | |

NORDSTROM/46766626 (CBI*, TRW, TUC)
| I | 04-86 | 102 | 0 | -0- R-1 | CURRENT | 05-90 | 02 | 01 | 00 | 35 | 04-90 |
| | Hist: 05-90 | 132111111111112111111111 | | | | | | | | | |

J C PENNEY/805335406620 (CBI, TRW, TUC)
| I | 08-82 | 100 | 0 | -0- R-1 | CURRENT | 05-90 | 00 | 00 | 00 | 60 | |
| | Hist: 05-90 | 111111111111111111111111 | | | | | | | | | |

CHEMICAL BANK/2870000147746981 (CBI, TRW*, TUC)
| I | 02-87 | 405 | 0 | -0- R-1 | CURRENT | 05-90 | 01 | 00 | 00 | 32 | 01-90 |
| | Hist: 05-90 | 111121111111111111111111 | | | | | | | | | |

U.S. BANCORP VSA/4000117967006019 (CBI, TRW, TUC)
| I | 01-89 | 1500 | 0 | -0- R-1 | CURRENT | 05-90 | 00 | 00 | 00 | 10 | |
| | Hist: 05-90 | 1111111111 | | | | | | | | | |

NATIONAL CREDIT CRP/3731386704200 (TRW, TUC)
| I | 12-75 | -0- | 0 | -0- O-1 | CURRENT | 05-90 | 00 | 00 | 00 | 24 | |
| | Hist: 05-90 | 1————————1 | | | | | | | | | |

| Account Name/Number (Sources) | | | | | | | Past due | | | | Last |
|---|---|---|---|---|---|---|---|---|---|---|---|
| Open | High | Pymt | Balance | MOP | Status | Rptd | 30 | 60 | 90+ | MR | Diq |

WASHINGTON FEDERL/4412411852133 (TRW, TUC)
| I | 10-75 | 2300 | 0 | -0- R-1 | CURRENT | 04-90 | 00 | 00 | 00 | 10 | |
| | Hist: 04-90 | 1111111111 | | | | | | | | | |

AUTOS R US/FSA30175Y8 (CBI, TUC)
| I | 08-86 | 4936 | 0 | CLOSED I-1 | CURRENT | 11-87 | 00 | 00 | 00 | 15 | |
| | Hist: 11-87 | 111111111111111 | | | | | | | | | |

Inquiries made in the last 180 days:
- 8-25-90   USA MTG (TRW)
- 9-5-90    CREDCO IMS (TUC)
- 9-6-90    CREDCO OR (CBI, TRW, TUC)

Address Information:
1. 2865 SE 101
   PORTLAND, OR 97011 Rptd 12-85 (CBI, TRW, TUC)
2. 00 FOOTHILLS APTS
   PORTLAND, OR 97011 Rptd 02-87 ( CBI)
3. 2865 S 101
   CHICAGO, IL 60621 Rptd 11-82 (CBI)
4. 524A HARRISON AV
   LODI, NJ 07644 (TRW)
5. 5241 H
   , 07644 (TRW)
6. 65241 HARRISON AV
   LODI, NJ 07644 (TRW)
7. 542 H
   , 07644 (TRW)

AKA Information:
1. SAMPLE, SAM (CBI)
2. SAMPLE, SAMUEL (TRW)
3. SAMPLE, SAM R. (TUC)

TABLE 8-continued
Representative Credit Report

Employment Information:
1. NATIONAL WEATHER BOISE, ID
   METEOROLOGIST (CBI)
2. TOUCHE ROSS
   MANAGER Rptd 11-84 (TUC)

Public record information:
NOTE:    Public records may contain duplicate information. This report displays all information reported by the repositories accessed.
1. JUDGEMENT FILED IN 03-85 BY D ROSENTHAL AGAINST SAM R. SAMPLE FOR $1000; STATUS UNKNOWN; (CBI-#55822)
2. FORECLOSURE INFO: $61674 N AMER MTG 2379 BRIARWEST 98 CHI; REPORTED 05-85 (CBI-#12255)
3. CIVIL JUDGMENT FILED BY DUKE ALFORD FOR $1000; STATUS UNKNOWN; REPORTED 08-87 (TUC-#583964)
4. TAX LIEN FILED FOR $452; STATUS RELEASED 05-88; REPORTED 12-87 (TUC-#87337007088)

Financial Information:
1. OTHER INCOME OF $10000 FROM PAPER ROUTE REPORTED 10-89; (CBI)
2. SAVINGS ACCOUNT OPENED 10-87 UNDER FINANCIAL BANK #ACCOUNT NBR 11111L BALANCE $5000 (TUC-F123456)

Miscellaneous Information:
1. COURT RECORDS VERIFIED 05-90 (CBI)

Consumer Information:
1. WAS IN HOSPITAL FOR TWO MONTHS IN 1986; UNABLE TO PAY NORDSTROM ON TIME. (TRW)

Consumer referral Information:
CBI  -  CBI SEATTLE, PHONE: (206) 865-0255
          14335 NE 24TH ST., STE. 120, BELLEVUE, WA 9807
TRW  -  TRW CREDIT DATA, PHONE: (503) 245-1352
          9570 S.W. BARBUR BLVD., SUITE 311, PORTLAND, OR 97219
TUC  -  TRANS UNION CORPORATION, PHONE: (714) 870-5191
          P.O. BOX 3110, FULLERTON, CA 92634
Prepared By:  CREDCO, INC.
          777 S. PCH, SUITE 112, SOLANA BEACH, CA 92075 (800) 637-2422
END OF REPORT

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed as the invention is:

1. A system for generating a credit report which comprises:

plural repositories of credit information;

a central data processing means;

a user terminal;

a first data link for connecting said user terminal to said central data processing means;

and additional data links for connecting said central data processing means to each of said repositories of credit information;

said central data processing means including; means responsive to a message reaching it via the first data link for activating the additional data links and consequentially retrieving from each of the plural repositories items of credit information related to an entity identified from the user terminal; means for comparing the items of credit information retrieved from the different repositories, eliminating items of credit information duplicated in the different repositories, and selecting the most accurate of different versions of items of credit information retrieved from different ones of the repositories, sorting and merging the surviving items of credit information into a single credit report of selected format, and thereafter activating the first data link and transmitting the credit report over that data link to the user terminal.

2. A system as defined in claim 1 in which the central data processing means includes means for relating the order in which the repositories are searched for those items of information relevant to a specific request for a credit report.

3. A system as defined in claim 1 in which the user terminal includes a monitor, said system also comprising means at the user terminal for bringing up on said monitor a screen which can be filled in by an operator at said terminal with data which, when transmitted to said central data processing means over said first data link, will enable the generation of a credit report on a specified entity.

4. A system as defined in claim 1 which has means at said terminal for bringing up on said monitor a set of screens as aforesaid and means for batch-transmitting plural sets of data collected by filling in plural ones of said screens to said central data processing means.

5. A system as defined in claim 4 which includes operator-activatable means at the user terminal for interrupting the batch transmission of data sets to the central data processing means to enable the transmission of a high priority data set and the subsequent resumption of the batch transmission of the plural data sets to said central data processing means.

6. A system as defined in claim 1 in which the central data processing means is geographically removed from each of the repositories of credit information and the user terminal is geographically removed from said repositories and said central data processing means.

7. A system as defined in claim 6 in which said first data link and said additional data links all comprise dedicated, high speed, data transmission means.

8. A system as defined in claim 1 in which includes means at said user terminal by which an operator can designate the repository or repositories from which data will be retrieved by the central data processing means for inclusion in any particular credit report.

9. A system as defined in claim 1 in which the central data processing means has means for retrieving from each of the repositories with a single inquiry data relevant to applications for credit made by joint applicants.

10. A system as defined in claim 1 which has a plurality of user terminals each, said user terminals being connectable to the central data processing means by a transmission link.

11. A system as defined in claim 1 in which the central data processing means is capable of retrieving data simultaneously from multiple ones of said credit information repositories.

12. A system as defined in claim 1 in which the central data processing means has the capability of not merging data from different repositories if an account number is not provided for the retrieved items of credit information or if a retrieved item of credit information is an account type and the account type is collection.

13. A system as defined in claim 1 in which, the central data processing means has the capability of selecting best items of credit information to be included in the credit report by evaluating high credit, credit history, monthly payment, and balance of account data for each of an applicant's accounts with respect to which duplicated or conflicting items of credit information have been retrieved from different repositories.

14. A system as defined in claim 1 in which the central data processing means has the capability of comparing account types, opening dates of accounts, and account numbers in determining duplicate items of credit information.

* * * * *